United States Patent [19]
Lemke et al.

[11] 3,901,451
[45] Aug. 26, 1975

[54] DEVICE FOR DISPERSING ANIMAL EXCREMENT

[76] Inventors: Walter G. Lemke, 3206 May Rd., Richmond, Calif. 94803; Leslie W. King, 5524 Manila Ave., Oakland, Calif. 94618

[22] Filed: Nov. 29, 1973

[21] Appl. No.: 420,216

[52] U.S. Cl............................ 241/38; 241/46.11
[51] Int. Cl.²........................................ B02C 23/18
[58] Field of Search ..... 241/38, 46.11, 46.17, 46 A, 241/185 A

[56] References Cited
UNITED STATES PATENTS

| | | | |
|---|---|---|---|
| 2,577,716 | 12/1951 | Shelton | 241/46 A |
| 3,325,107 | 6/1967 | Peterson | 241/46 A |
| 3,788,564 | 1/1974 | Kokorzycki | 241/46 A |

Primary Examiner—Robert B. Reeves
Assistant Examiner—Larry H. Martin
Attorney, Agent, or Firm—Harris Zimmerman

[57] ABSTRACT

A device for breaking up and dispersing animal excrement, such as dog droppings, on lawns or the like. The device generally comprises a downwardly opening housing which is placed over the excrement by means of a generally vertically-extending tubular handle. The handle is fitted with a water fitting to which a source of pressurized water is connected, such as a garden hose, and conducts the water into said housing. The water, upon being introduced into said housing, is channeled in two channels and directions. A first channel directs the water in one or more jet streams adjacent the bottom of the device. A second channel directs the water to impact upon a rotatable water turbine wheel which is connected to a set of rotatable cutting blades.

The streams of water in said first channel force the excrement upwardly along an inclined ramp where it is cut by the cutting blades into pieces of smaller particulate sizes which then are forced by the water streams to pass through a perforated plate. These particles are then discharged through an orifice in the forward end of the housing by a plurality of paddles which are affixed to the turbine wheel and rotate therewith.

In alternative embodiments, an electric motor is used to rotate the cutting blades.

1 Claim, 15 Drawing Figures

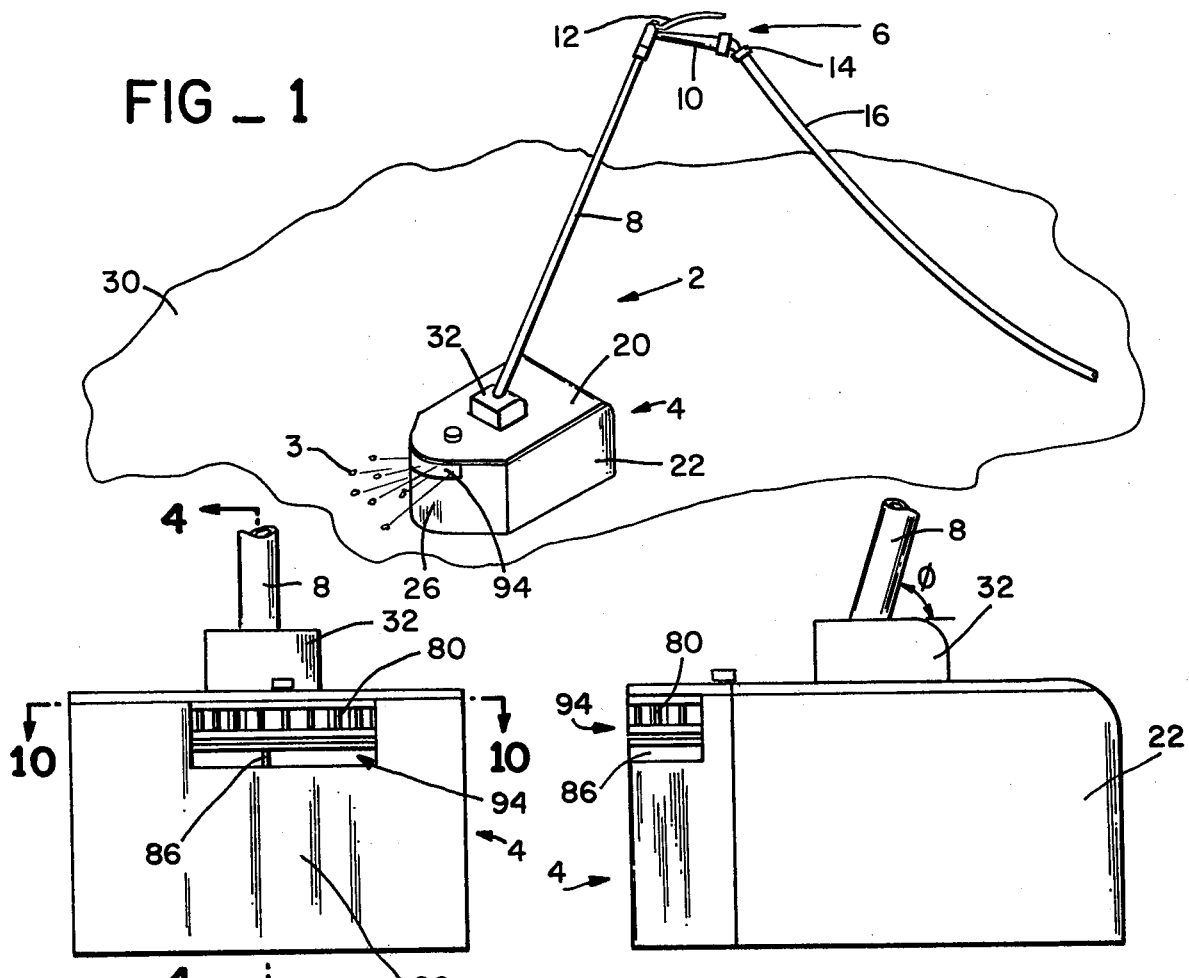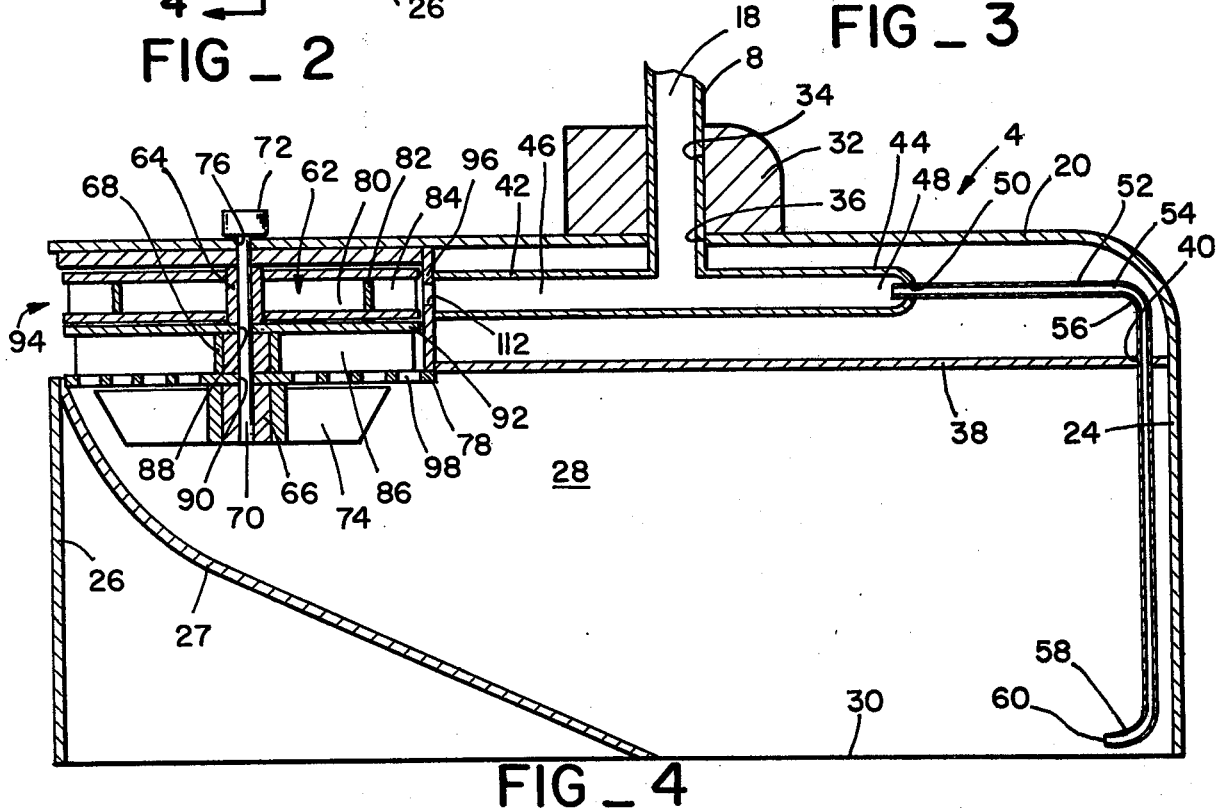

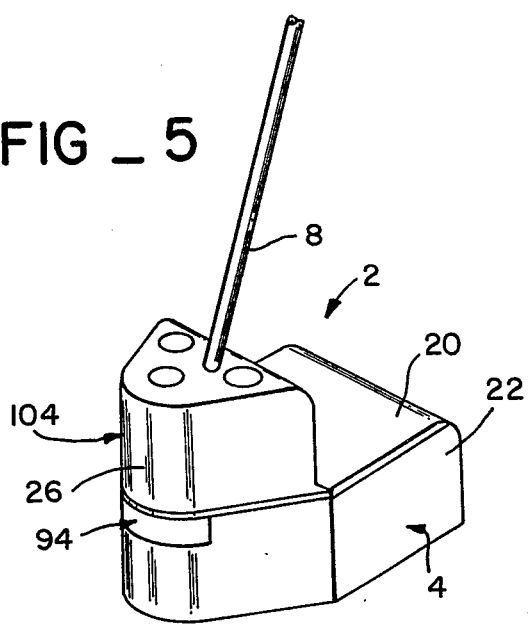
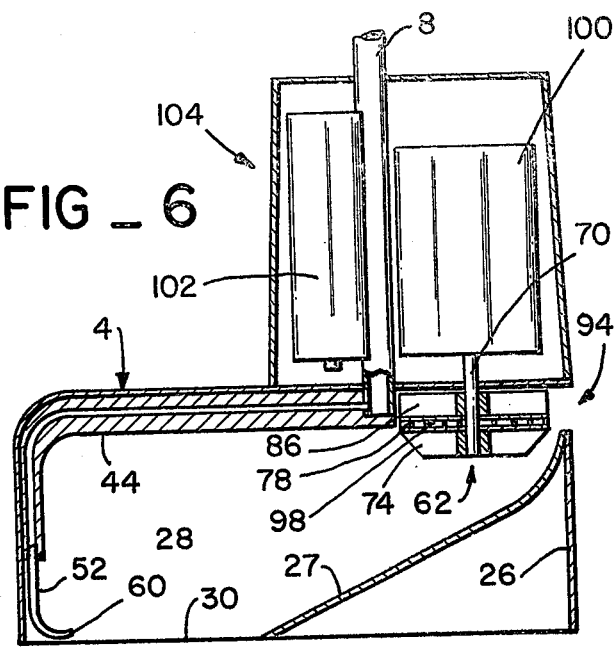
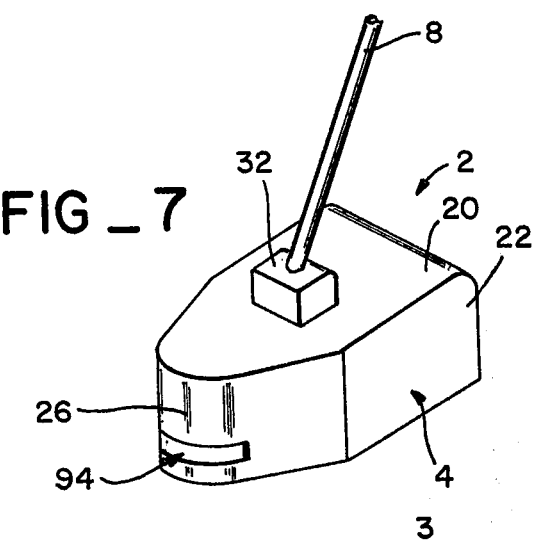
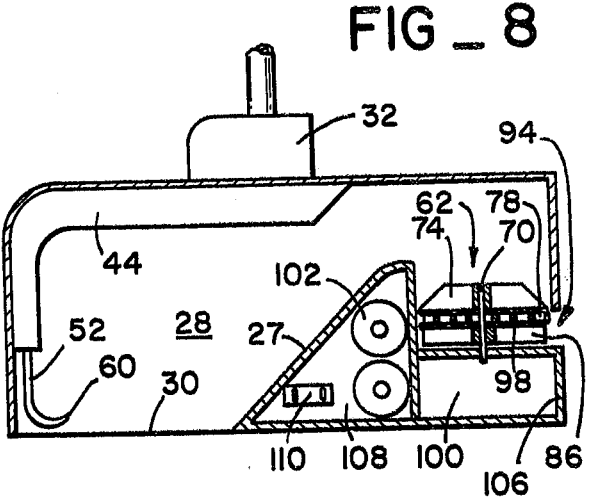
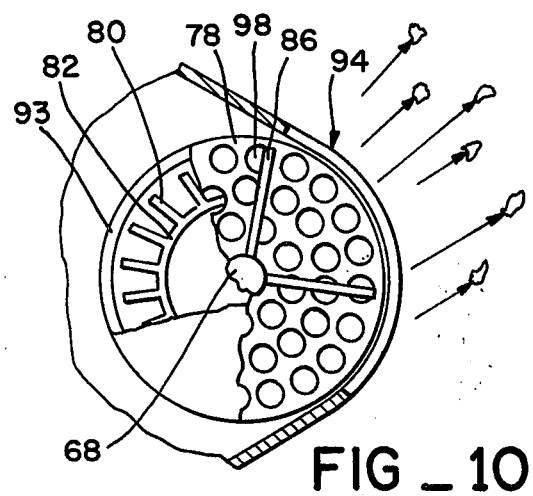
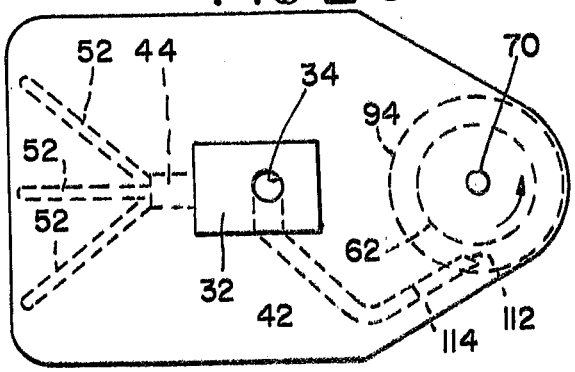

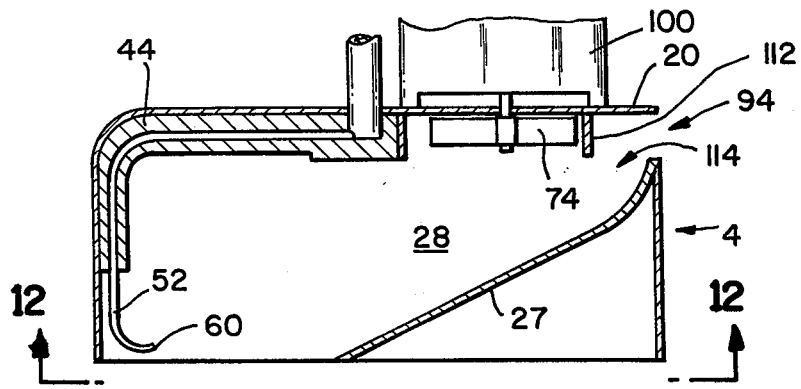
FIG_11
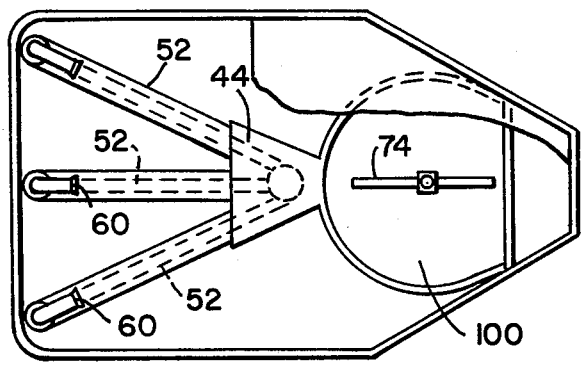
FIG_12
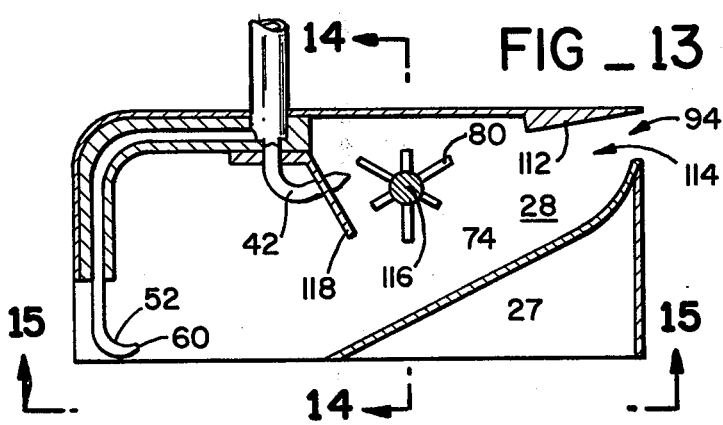
FIG_13
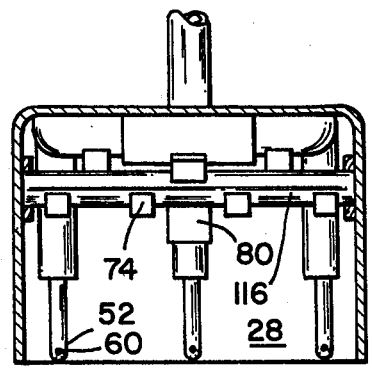
FIG_14
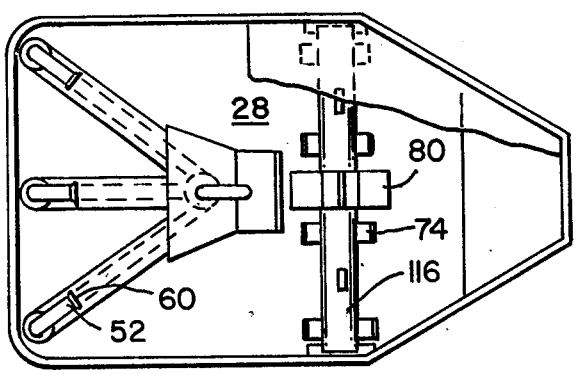
FIG_15

DEVICE FOR DISPERSING ANIMAL EXCREMENT

BACKGROUND OF THE INVENTION

As is well known to gardeners and the greenskeepers, as well as persons who tend flowerbeds and lawns, the removal and disposal of animal excrement therefrom, particularly dog droppings, is an unpleasant and time-consuming chore.

Of the devices developed to remove excrement, the majority employ a variety of arrangements to pick up said droppings and deposit same in a pouch, bag or similar receptacle which must then be itself disposed of.

It is, therefore, a purpose of this invention to provide a device which will, when placed over the excrement, quickly and effortlessly cut same into pieces of smaller particulate size and disperse same into said lawn or garden for fertilizing purposes.

It is a further purpose of this invention to provide an excrement dispersal device which is compatible and easily used with a standard garden hose.

It is a still further purpose of this invention to provide a basic device to accomplish the foregoing, which device is not limited solely to the dispersal of animal excrement, but whose principles may be extended to the dispersal or removal of a variety of agglomerate substances.

THE DRAWINGS

FIG. 1 is a perspective view of the entire apparatus of the instant invention.

FIG. 2 is a frontal elevation of the apparatus of FIG. 1.

FIG. 3 is a left-side elevation of the apparatus of FIG. 1.

FIG. 4 is a left-side sectional elevation of the apparatus of FIG. 1 taken along section line 4—4 in FIG. 2.

FIG. 5 is a perspective view of a first alternative embodiment of the instant invention.

FIG. 6 is a right-side sectional elevation of the apparatus of FIG. 5.

FIG. 7 is a perspective view of a second alternative embodiment of the instant invention.

FIG. 8 is a right-side sectional elevation of the apparatus of FIG. 7.

FIG. 9 is a top plan of the apparatus of FIG. 1.

FIG. 10 is a partial sectional plan of the apparatus of FIG. 1, taken along section line 10—10 in FIG. 2.

FIG. 11 is a right side sectional elevation of a fourth alternative embodiment of the instant invention.

FIG. 12 is a top plan view of the apparatus depicted in FIG. 11.

FIG. 13 is a right side sectional elevation of a fifth alternative embodiment of the instant invention.

FIG. 14 is a front sectional elevation, taken along line 14—14 of FIG. 13.

FIG. 15 is a top plan view of the apparatus shown in FIGS. 13 and 14.

DESCRIPTION OF A PREFERRED EMBODIMENT

Referring generally to FIGS. 1 – 4 and 9 – 10, preferred embodiment of the excrement dispersal device 2 may be seen to comprise a lower body portion 4, a hand grip 6, and a tubular extension shaft 8 therebetween.

Hand grip 6 comprises a standard manual-control water valve with a basic shank portion 10, a palm trigger 12, and a threaded water-inlet fitting 14 for attachment to an external garden hose 16. Garden hose 16 is attached to an external pressurized water supply and, upon squeezing of trigger 12, water is introduced into conduit 18 of shaft 8. It is noted that shaft 8 is of length sufficient to permit operation of the device without stooping or bending by the operator.

Lower body portion 4 of the instant device, best seen in FIG. 4, is comprised of a generally horizontal planar top wall 20, two generally parallel and vertical side walls 22, a generally vertical rear wall 24, a generally vertical and arcuate front wall 26 having an opening 94 in its upper arcuate surface, and a semi-arcuate upwardly inclined ramp wall 27. These six walls form a closure 28 when the lower body portion 4 is placed on or adjacent the lawn 30 as illustrated in FIG. 1. In actual operation, this lower body portion would be placed over the animal excrement to be dispersed in such a fashion that said excrement would be contained in said closure 28.

As is best seen in FIG. 4, placed generally atop said lower body portion and fixedly fastened to said top wall 20 is a crown collar 32. Collar 32 has a generally vertical cylindrical bore 34 extending therethrough, which bore is in registration with a cylindrical bore 36 of like diameter in top wall 20. Tubular extension shaft 8 passes through both bores 34 and 36 so as to depend into recess 28. As is illustrated in FIG. 3, the axes of bores 34 and 36 may be inclined at an angle $\phi$ to the horizontal so as to permit ease of operation of the device generally forward of the operator. This will permit the operator to disperse the animal excrement at a distance from his person, yet still permit the lower edges of walls 20, 22 and 24 to rest simultaneously in contact with the grade surface of said lawn 30 so as to preclude spatter of water and excrement upon the operator's shoes and clothing.

Also disposed within said closure 28 is a generally horizontal internal wall 38 fixedly fastened to the interior surfaces of rear wall 24 and side walls 22. Disposed in wall 38 adjacent rear wall 24 are one or more vertically extending cylindrical bores 40. The lower portion of tubular shaft 8, which depends into closure 28, branches into two generally horizontally extending conduit branches, a forward conduit 42 and a rear conduit 44, comprising passageways 46 and 48 respectively. As may be best seen in FIG. 9, the forward conduit 42 extends generally horizontally forward through vertical arcuate wall 96 which partially surrounds rotor assembly 62, discussed below, and terminates in an outlet orifice 112 which is directed toward rotor assembly 62.

As is best seen in FIGS. 4 and 9, horizontally fitted into rearwardly opening orifice 50 in rear conduit 44 is a plurality of tubular pipes 52 comprising conduits 54 therein. As may be seen in FIG. 4, by means of a 90° bend 56, each pipe 52 is caused to extend generally vertically through the bore 40 in wall 38 and generally downwardly toward the surface of lawn 30. Immediately adjacent lawn 30 an additional bend 58 is formed into each pipe 52 and each pipe end is appropriately pinched so as to form a slightly upwardly directed nozzle 60 at the end thereof.

Also disposed within chamber 28 is the aforementioned rotor assembly 62, comprising three coaxial elements; i.e., an upper turbine wheel, a lower cutter wheel, and an intermediate paddle wheel disposed therebetween. Referring to FIGS. 4 and 10, the upper turbine wheel is comprised of a central hub 64, a plurality of radially extending walls 80 affixed thereto; and an annularly extending wall 82 intersecting said radial walls and generally normal thereto so as to form turbine buckets 84. The intermediate paddle wheel is comprised of a central hub 66 and a plurality of radially extending cutter blades 74 affixed thereto. Disposed between turbine wheel 64 and paddle wheel 68 is a stationary solid wall section 92. Disposed between paddle wheel 68 and cutter wheel 66 is a particle size discrimination means comprising, in the instant embodiment, a perforated stationary plate 78 having a plurality of perforations 98 extending vertically therethrough. The respective hubs of each of the three aforementioned wheels are fixedly fastened to a vertically extending shaft 70 which is rotatably suspended by a keeper 72, and which extends through, is journalled by, and is maintained in vertical alignment by bore 76 in top wall 20, bore 88 in wall section 92, and bore 90 in perforated plate 78. Thus, it may be seen that the three wheels in rotor assembly 62 rotate together in fixed angular relationship with each other and shaft 70 without relative rotation between said wheels and said shaft. As may be best seen in FIG. 9, section 114 of forward conduit 42 and outlet orifice 112 are horizontally spaced from the vertical axis of shaft 70 and so oriented that the axis of section 114 is generally tangentially directed at circular rotor assembly 62. Thus, when water is sprayed from passageway 46 into turbine buckets 84 from outlet orifice 112, the kinetic energy of the water may be converted to rotary impulsed rotation of the entire rotor assembly 62 in the direction indicated by the arrows in FIGS. 9 and 10.

OPERATION

The operation of the apparatus of the instant invention is as follows. By hand manipulation of hand grip 6, the lower body portion 4 of the device is placed over the animal excrement to be dispersed so that same is enclosed in closure 28 and so that the lower edges of walls 22, 24, 26 and 27 all simultaneously touch lawn 30. Then by squeezing palm trigger 12, pressurized water is introduced into tubular extension shaft 8 from garden hose 16 which is attached to inlet fitting 14 on shank portion 10. Pressurized water then flows downwardly through conduit 18 in shaft 8 and branches both forward into passageway 46 in conduit 42 and rearward into passageway 48 in conduit 44.

Water which flows into forward passageway 46 of forward conduit 42 is directed by outlet orifice 112 to impinge upon buckets 84 of the turbine wheel and, thereby, effect rotation of all three elements of rotor assembly 62; i.e., the turbine wheel, the paddle wheel, and the cutter wheel. This motivating water is then exhausted via forward opening 94 in wall 26.

Water which flows into rearward passageway 48 is caused to enter the conduits 54 in pipes 52, and flow through bends 56 and 58 and exhaust through pinch nozzles 60. It is noted that, preferably, the diameter of each conduit 54 is smaller than that of passageway 48, so as to increase the velocity of water flowing in conduits 54. The pinch nozzles 60 similarly serve to increase the exhaust velocity of said water into closure 28. This increased-velocity water stream impacts upon the animal excrement on lawn 30 contained within a closure 28, and forces same forward along and up inclined ramp 27 and causes same to be hurled into the path of rotating cutter blades 74. Cutter blades 74 impact upon said excrement and reduce said excrement particulate size. Since the bulk of animal excrement is water soluble to some degree, this process will be continuously repeated until a slurry of water and excrement particles 3 is attained. Once the particulate size of said excrement is smaller than the diameter of perforations 98 in perforated plate 78, said particles 3 in said slurry will be forced upwardly through said perforations into the path of rotating paddles 86. Paddles 86 will impact upon said excrement particles, and because the entire rotor assembly 62 is partially enclosed by vertical wall 96, they will hurl said particles forward and out of lower body portion 4 away from the operator via exhaust opening 94 in forward wall 26. As is best shown in FIG. 2, exhaust opening 94 is not symmetric about the major vertical axis of the lower body portion 4, but rather is larger on that side which faces the oncoming paddles so as to more efficiently exhaust the water slurry.

Thus it may be seen that with the apparatus of the instant invention, animal excrement may be easily and cleanly dispersed without operator bending or stooping and without need for shovels, receptacle bags, and the like. And, further, the fertilizer value of the animal excrement is provided to the lawn.

ALTERNATIVE EMBODIMENTS

A second embodiment of the instant invention is illustrated in FIGS. 5 and 6. In this embodiment, the water turbine wheel of the rotor assembly is eliminated, but paddles 86, cutter blades 74 and perforated plate 78 are retained. Similarly retained are inclined ramp wall 27, rear conduit 44 and exhaust opening 94 in arcuate front wall 26. Rotary motivation is imparted to both paddle 86 and cutter blades 74 via rotatable shaft 70 by a direct-current motor 100 powered by one or more batteries 102. Both the motor and the batteries are contained in a water-sealed upper housing 104, disposed generally above lower body portion 4, through which passes tubular extension shaft 8 to provide pressurized water to rear conduits 44. As in the preferred embodiment, excrement is forced by water from jet 60 upward along ramp wall 27 into said cutter blades 78, upward through perforations 98, and hurled by rotating paddles 86 out through exhaust opening 94.

A third embodiment is illustrated in FIGS. 7 and 8 which, similar to the previously-disclosed embodiment, uses a direct current motor 100 and batteries 102 to motivate the cutter blades 74 and paddles 86. Both the motor and batteries are contained in water-sealed compartments 106 and 108 respectively. Battery compartment 108 is equipped with an electrical connector 110 so that rechargeable batteries, such as of the nickel-cadmium type, may be used. In this embodiment, however, the motor is placed below the rotor assembly, and the cutter blades 74 are placed above perforated plate 78, paddles 86, and exhaust opening 94. Thus it may be seen that water exiting from jet 60 will drive the excrement upward along ramp wall 27 and downward into the rotational path of cutter blades 74. The resultant slurry of excrement particles and water then passes downward through perforations 98 in plate 78 into the rotational path of paddles 86 which hurls same horizontally forward through exhaust opening 94.

A fourth embodiment is illustrated in FIGS. 11 and 12 which also uses an electric motor, generally designated as 100, mounted generally above the lower body portion 4. Said motor rotates cutter blades 74. Inclined ramp wall 27, rear conduit 44, pipes 52, and exhaust opening 94 are retained, but the perforated plate is eliminated. Rather, in this embodiment, the particle-size discrimination means comprises a baffle 112 which extends vertically downwardly from the horizontal top wall 20 into closure 28 and partially occludes the exhaust opening 94 by forming a stricture 114 between its lower edge and the upper surface ramp 27. Thus it may be seen that, as in the foregoing embodiments, water exiting from jet 60 will drive the excrement upward along ramp 27. Excrement particles small enough to pass through stricture 114 will be exhausted via forward exhaust opening 94. Particles too large to pass through said stricture 114 will be deflected by the lower edge of said baffle into the path of cutter blades 74 where said blades will impact upon said particles and reduce their size. This process will be repeated until the particulate size is sufficiently small to pass through stricture 114 and be exhausted via forward exhaust opening 94.

A fifth embodiment is illustrated in FIGS. 13, 14 and 15. The inclined ramp wall 27, pipes 52 and exhaust opening 94 are retained, but again the perforated plate is eliminated in favor of a downwardly depending baffle 112 forming the stricture 114 between its lower surface and the upper surface of ramp 27. Both radially-extending water-impact turbine walls 80, and radially extending cutter blades 74 are mounted on a rotatable shaft 116 which horizontally extends through the closure 28. The forward water conduit 42 extends through and is supported by a vertically depending deflector baffle 118 which is inclined slightly toward the aforesaid rotatable shaft 116. Thus it may be seen that water exiting from conduit 42 will impact upon turbine walls 80 and impart rotary motion to cutter blades 74. It may be further seen that water exiting from jets 60 will drive the excrement upwardly along ramp 27 where excrement particles small enough to pass stricture 114 will be exhausted via forward exhaust opening 94. Particles too large to pass said stricture 114 will be deflected by said baffle 112 rearwardly into the path of rotating cutter blades 74 which will reduce the size of said particles so as to be able to pass through stricture 114 and be exhausted via opening 94.

It may be appreciated that in each of the foregoing alternative embodiments which employ electrical motors and batteries to achieve motive power, an appropriate on-off switch device and appropriate wiring will also be required.

We claim:

1. An apparatus for dispersing an agglomerate substance disposed on a surface, comprising a housing means which forms a chamber enveloping said substance when the walls of said housing means are placed in contact with said surface, said chamber having at least one discharge port therein, cutter means contained within said housing, a fluid pressure means for removing said substance from said surface and transferring said substance to said cutter means, and then from said cutter means through said discharge port, a control means comprising a grip means, a fluid inlet means, and a controllable valve means, said control means being spaced from said housing means by a tubular extension means which conducts a fluid from said control means to said fluid pressure means.

* * * * *